UNITED STATES PATENT OFFICE.

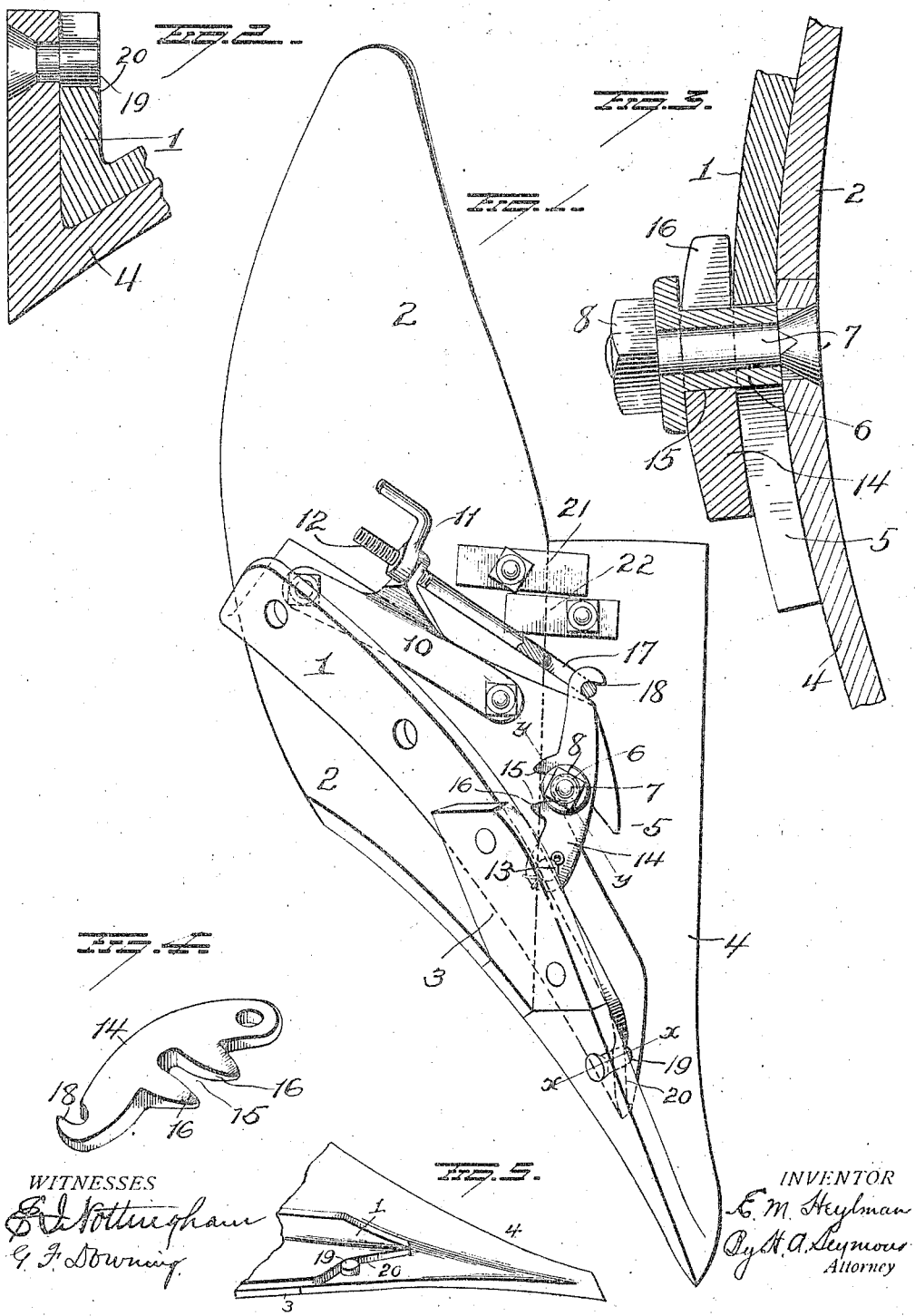

EDWARD M. HEYLMAN, OF SOUTH BEND, INDIANA, ASSIGNOR TO OLIVER CHILLED PLOW WORKS, OF SOUTH BEND, INDIANA.

PLOW.

1,081,530.

Specification of Letters Patent.

Patented Dec. 16, 1913.

Application filed May 15, 1913. Serial No. 767,937.

*To all whom it may concern:*

Be it known that I, EDWARD M. HEYLMAN, of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

My invention relates to an improvement in plows.

In gang plows as now constructed, the gangs are of such width and the plows so close together, that it is difficult to get at the bolts and nuts for the removal and replacement of the blades, and the object of this invention is to provide means, operable from the rear of the plow, for securing the blade to the frog, thus dispensing entirely with the use of bolts and nuts now universally used for securing these parts together, and permitting the blade to be removed and replaced from the rear of the plow.

With these ends in view my invention consists in the parts and combination of parts and in the details of construction as will be more fully described and pointed out in the claims.

In the accompanying drawings, Figure 1 is a view in perspective taken from the underside of the plow; Fig. 2 is a view in section on the line $x$—$x$ of Fig. 1; Fig. 3 is a view on the line $y$—$y$ of Fig. 1; Fig. 4 is a view of the locking lever detached, and Fig. 5 is a view in elevation showing the pin for locking the point of the plow to the frog.

1 represents the frog of the plow which may be of malleable or cast metal. It is approximately V-shape in cross section, one side member of which carries the moldboard 2, and the other side member carries the landside 3, the said moldboard and landside being secured to the frog by bolts and nuts. The lower end or foot of the frog 1 is enlarged and projects below the moldboard and in front of the latter, and also in front of the landside, to form a support for the blade or wing 4.

The lower end or foot of the frog is provided with a slot 5, which projects rearwardly and upwardly for the passage of the headed thimble 6 mounted on the bolt 7, secured to the blade 4. The slot 5 should be considerably wider than the thimble 6, so that the wall of slot 5 will never contact with the thimble 6, as a contact between the thimble and front wall of slot would prevent the eccentric or cam face of lever 14, to be hereinafter referred to, from forcing blade 4 endwise.

The head of bolt 7 rests in a countersunk opening in the blade 4, so as to rest flush with the outer surface of the latter, and the thimble 6 on said bolt 7, is held in place by the nut 8, which latter is screwed onto the bolt and bears against the flanged end of the thimble.

Secured to the inner face of one side member of the frog 1, by bolts and nuts which secure the mold board to the frog, is the T-shaped bracket 10. The cross member of this bracket rests in contact with and is secured to the frog, while the central member thereof extends rearwardly and is bent at its free end, to form an abutment for the handle nut 11. This abutment is provided with a hole for the passage of the link rod 12, the handle nut 11 being secured on the threaded end of said link rod and bearing against the abutment at the rear end of bracket 10.

Pivotally mounted on a stud 13 projecting from the rear face of frog 1, at one side of the slot 5, is the lever 14, provided at a point intermediate its ends with a slot 15 open at the rear, the side walls 16 of the slot being wedge shape, and its front side wall being eccentric with the pivot of lever 14, so that when the lever is drawn into locking position by the handle nut 11, the eccentric wall of the slot contacting with the thimble forces the landside of the blade into close contact with the landside section of the frog and lower edge of the mold board and also draws the rear end of the landside of the blade or nose into close contact with the front end of landside 3, thus absolutely locking the blade against any endwise movement. This slot 15 is so located with relation to the slot 5 in the foot of the frog, that when the thimble 6 on bolt 7 is entered in said slot 5, the slot 15 will be in line with the thimble. The free end of lever 14 is detachably engaged by the link 17 integral with the rod 12, and is provided with a slot 18 in which the link seats and which prevents accidental separation of the parts after they have been assembled and locked. The lever 14 may be turned forwardly to clear the slot 5, thus permitting the thimble 6 carried by the blade 4 to be entered in a slot 5, after which the lever 14 is pulled rearwardly until it engages the thimble. By now connecting the link 17 of rod 12 with the free end of lever 14, and turning the handle nut in a direction to draw the rod 12 rearwardly, the rear edge of the blade will be drawn back solidly into continuous contact with the frog and also with the front end of the moldboard and landside, and the wedge shaped walls 16, of slot 15, contacting with the head of thimble 6, will draw the blade inwardly into close contact with the foot of the frog.

The inner face of the landside section of the nose of the blade is provided with a lug 19 adapted to rest against a cam face 20 on the lower end of the frog. This lug is located about midway the point or nose of the frog, and the rear end of the landside section of the nose of the blade, and operates to effectually hold the blade in contact with the foot of the frog against a force tending to depress or elevate the nose or point of the blade. The heel end of blade 4 is held against rearward deflection by the plate 21 secured to the mold board and overlapping the under face of the blade, and is prevented from outward bending by the plate 22 secured to the rear face of the blade and overlapping the lower end of the mold board. These two plates 21 and 22 serve to hold the meeting edge of the mold board and blade in perfect alinement after the parts have been assembled.

With this improvement, by simply disconnecting the link rod from the lever, the blade will be free to be removed by the application of pressure to the heel thereof, and a new one may be passed under the plow from the rear and over the projecting end of the foot of the frog and positively secured against the possibility of accidental displacement by the lever and link rod as previously described.

It is evident that many slight changes might be made in the relative arrangement of parts shown and described without departing from the spirit and scope of my invention. Hence I would have it understood that I do not wish to confine myself to the exact construction and arrangement of parts shown and described, but Having fully described my invention what I claim as new and desire to secure by Letters Patent, is:—

1. In a plow, the combination with a frog, mold board and blade, the frog having an open slot in its front lower end, and the blade provided with a projection to enter said slot, of a lever pivoted to said frog and adapted to engage said projection and lock the same in the slot in the frog, a rod connected with said lever and means for locking the rod.

2. In a plow, the combination with a frog, mold board and blade, the frog having an open slot in its front lower end and the blade provided with a projection to enter said slot, of a lever pivoted at one end to the frog and provided with a slot to receive the projection on the blade, and a screw rod connected with the opposite end of said lever for locking the latter in contact with the projection on the blade.

3. In a plow, the combination with a frog, moldboard and blade, the frog having an open slot in its front lower end and the blade provided with a headed projection to enter said slot, of a lever pivoted at one end to the frog and provided with a slot, the side walls of which are wedge shaped to engage the head of the projection and draw the blade into close contact with the foot of the frog, a screw rod detachably secured to the free end of said lever and means for locking the screw rod and lever against accidental movement.

4. In a plow, the combination with a frog, moldboard and blade, the frog having an open slot in its front lower end, and the blade provided with a lug adapted to take under the foot of the frog on the landside of the plow, and with a headed projection to enter the slot in the foot of the frog, a lever pivoted to the frog and adapted to rest in front of the projection in the slot of the frog, a link rod detachably secured to the free end of said lever and passing through a fixed abutment and a nut screwed onto said rod for locking it in place.

5. In a plow, the combination with a frog having an open slot in its lower end, a moldboard, a blade, a projection on the mold board overlapping the rear face of the blade, a projection on the blade overlapping the rear face of the moldboard, a bolt carried by the mold board and adapted to rest in the slot in the frog, a lever pivoted to the frog and crossing the slot in front of the bolt, a link rod detachably engaging the free end of said lever and passing through a fixed abutment and a nut for locking said rod and lever in place.

6. In a plow the combination with a frog, mold board and blade, the frog having an open slot in its front lower end, and a blade provided with a projection to enter said slot, of a lever pivoted to said frog and provided with a slot which is eccentric to the pivot of the lever, the said slot adapted to receive the projection on the blade and by its cam action draw the landside of the blade solidly against the landside section of the frog, and means for actuating said lever.

In testimony whereof, I have signed this specification in the presence of two subscribing witnesses.

EDWARD M. HEYLMAN.

Witnesses:
 EDWIN NICAR.
 KATE E. BUCK.